US011907233B2

(12) United States Patent
Little et al.

(10) Patent No.: US 11,907,233 B2
(45) Date of Patent: Feb. 20, 2024

(54) METHOD AND APPARATUS FOR SELECTING A RESOURCE FOR CONNECTING TO A SPACE VEHICLE

(71) Applicant: Raytheon Company, Waltham, MA (US)

(72) Inventors: Varian S. Little, Aurora, CO (US); Vincent Pascente, Aurora, CO (US); Jared B. Dorny, Aurora, CO (US)

(73) Assignee: Raytheon Company, Tewksbury, MA (US)

( * ) Notice: Subject to any disclaimer, the term of this patent is extended or adjusted under 35 U.S.C. 154(b) by 399 days.

(21) Appl. No.: 17/476,811

(22) Filed: Sep. 16, 2021

(65) Prior Publication Data

US 2023/0079220 A1 Mar. 16, 2023

(51) Int. Cl.
*G06F 16/24* (2019.01)
*G06F 16/2457* (2019.01)
*G06Q 10/0631* (2023.01)

(52) U.S. Cl.
CPC . *G06F 16/24578* (2019.01); *G06Q 10/06315* (2013.01)

(58) Field of Classification Search
CPC ............ G06F 16/24578; G06Q 10/06315
See application file for complete search history.

(56) References Cited

U.S. PATENT DOCUMENTS 10,797,785 B1 10/2020 Rhee
2020/0007224 A1 1/2020 Hawthorne et al.

FOREIGN PATENT DOCUMENTS

EP 3737003 11/2020
EP 4005934 A1 6/2022

OTHER PUBLICATIONS

Search Report and Written Opinion dated Jan. 19, 2023, for PCT Application No. PCT/US2022/043791; 15 pages.

*Primary Examiner* — Curtis B Odom
(74) *Attorney, Agent, or Firm* — Daly, Crowley, Mofford & Durkee, LLP

(57) ABSTRACT

A method, including receiving a search query for resources that are configured to establish a connection with a space vehicle, the search query including a first value for a connection parameter; identifying one or more tactic definitions that satisfy the search query, each of the tactic definitions including one or more second values for the connection parameter, wherein at least one of the second values for the connection parameter matches the first value for the connection parameter that is included in the search query; and generating one or more tactic options, each of the tactic options being generated based on a respective one of the tactic definitions, each of the tactic options being associated with a respective resource of the tactic option.

20 Claims, 18 Drawing Sheets

FIG. 1

TACTIC SEARCH PARAMETERS

400

| | | |
|---|---|---|
| Name | SatSim | ⊗ |
| Description | SatSim | ⊗ |
| Asset(s) | Aurora_Lime ⊠ | ⊗ — 404 |
| Target | Worldview | ⊗ — 402 |

418

Commanders Guidance
- P-Success: 99
- P-Detection: 1
- Col. Damage: 1
- Attribution: 1
- P-Damage: 1

| | | |
|---|---|---|
| Window Start | 00:00:00 | ⊘ |
| Window Stop | 00:00:00 | ⊘ |
| Duration | 00:00:30 | ⊘ |
| Priority | [1-100] | ⊗ |

07/23/2021
07/24/2021  Current

406

Tactic Type [1-100] ▽

408

416
Max RX Power  50 dBm
414
Max TX Power  50 dBm
SPINS

Received Parameters — 410
| Frequency (MHz) | 904 | ⊗ |
|---|---|---|
| Overall Gain (dB) | 20 | ⊗ |
| Sample Rate (MSps) | 1 | ⊗ |
| Planned Pwr (dBm) | 30 | |

Transmit Parameters — 412
| Frequency (MHz) | 906 | ⊗ |
|---|---|---|
| Overall Gain (dB) | 20 | ⊗ |
| Sample Rate (MSps) | 1 | ⊗ |
| Planned Pwr (dBm) | 28 | ⊗ |

```
"resourceID": {
    "id": "eb1288c5-8c7c-11e9-9450-7e9097c77e89", "name": "Aurora_Ettus_Ch0"
},
"platformID": { "id": "b65d8dc0-446c-11e6-aefd-0242a0492861", "name": "Aurora" },
"resourceClass": "com.rtn.xdm.resource.rfcomms.Ground2SpaceRFCommsResource",
"resourceParameters": {
    "SPIN_UP_TIME": "90",
    "RESOURCE_TYPE": "Ground2Space",
    "RECEIVER_TYPE": "Ettus",
    "RFCOMMS_RESOURCE_SUPPORTED_FREQUENCIES": "{\"entries\": [ {\"minimum\": -10.0, \"minimumInclusive\": true, \"maximum\": 6020.0, \"maximumInclusive\": true, \"CLASS_TYPE\": \"java.lang.Double\"}], \"CLASS_TYPE\": \"java.lang.Double\"}",
    "RFCOMMS_RESOURCE_SUPPORTED_SAMPLERATES": "{\"entries\": [ {\"minimum\": 0.0980392, \"minimumInclusive\": true, \"maximum\": 200.0, \"maximumInclusive\": true, \"CLASS_TYPE\": \"java.lang.Double\"}], \"CLASS_TYPE\": \"java.lang.Double\"}",
    "RFCOMMS_RESOURCE_STEERABLE_ANTENNA": "true",
    "RF_TRANSMIT_POWER_RANGE": "{\"entries\": [ {\"minimum\": -10.0, \"minimumInclusive\": true, \"maximum\": 55.0, \"maximumInclusive\": true, \"CLASS_TYPE\": \"java.lang.Double\"}], \"CLASS_TYPE\": \"java.lang.Double\"}",
    "RF_RECEIVE_POWER_RANGE": "{\"entries\": [ {\"minimum\": -10.0, \"minimumInclusive\": true, \"maximum\": 45.0, \"maximumInclusive\": true, \"CLASS_TYPE\": \"java.lang.Double\"}], \"CLASS_TYPE\": \"java.lang.Double\"}", .....
```

```
..."RF_MODULATIONS":"{\"values\": [\"QAM\"] }, \"CLASS_TYPE\": \"java.lang.String\"} ",
"ANTENNA_GAIN" : 20.0,
"ANTENNA_POWER_CAPACITY" : "{ \"minimum\": -200.0, \"minimumInclusive\": true, \"maximum\":
200.0, \"maximumInclusive\": true, \"CLASS_TYPE\": \"java.lang.Double\" }",
"GRM_CONNECTION_INFO" : "{ \"host\": \"AURORA_ETTUS_GRM_HOST\", \"port\": \
AURORA_ETTUSCh0_GRM_PORT\"}",
"OBSCURA":
"0:0|15:0|30:0|45:0|60:0|75:0|90:4|105:7|120:7|135:5|150:3|165:5|180:5|195:10|210:20|225:28|240:34|255:28|
270:15|285:0|300:0|315:0|330:0|345:0|360:0",
"SDR_DRIVER" : "UHD", "SDR_RX_FILTER_BANDWIDTH" : 50000000, "SDR_TX_GAIN" : 31.5,
"SDR_TX_FILTER_BANDWIDTH" : 100000000, "SDR_FORMAT" : "CS16", "SDR_RX_GAIN" : 0.0,
"SDR_RX_FULL_GAIN_RANGE" : "{ \"entries\": [ { \"minimum\": 0, \"minimumInclusive\": true, \
"maximum\": 37.5, \"maximumInclusive\": true, \"CLASS_TYPE\": \"java.lang.Double\" } ], \"CLASS_TYPE\": \
"java.lang.Double\"}",
"SDR_TX_FULL_GAIN_RANGE" : "{ \"entries\": [ { \"minimum\": 0, \"minimumInclusive\": true, \
"maximum\": 31.5, \"maximumInclusive\": true, \"CLASS_TYPE\": \"java.lang.Double\" } ], \"CLASS_TYPE\": \
"java.lang.Double\"}",
"SDR_RX_CHANNEL" : "0"   }
```

FIG. 7
Continued

```
{
  "name": "PROCEDURE_C",
  "description": "Contact asset...",
  "tacticType": "TX_RX",                    ← 806
  "workflows": {
    "TX_RX": "RXTX_Contact.wf"
  },
  "linkMarginThresholds": {
    "DOWNLINK": 5.0,                         808
    "UPLINK": 4.0
  },
  "receivePowerCapacityRange": {
    "RX": {
      "minimum": -140.0,
      "minimumInclusive": true,              810
      "maximum": 45.0,
      "maximumInclusive": true,
      "CLASS_TYPE": "java.lang.Double"
    },
    "TX": {
      "minimum": -145.0,
      "minimumInclusive": true,              812
      "maximum": 35.0,
      "maximumInclusive": true,
      "CLASS_TYPE": "java.lang.Double"
    }
  },
  "rfCharacteristics": {
    "RF_TRANSMIT_FREQUENCY_RANGE": {
      "entries": [
        {
          "minimum": 34.2,
          "minimumInclusive": true,          814
          "maximum": 254.2,
          "maximumInclusive": true,
          "CLASS_TYPE": "java.lang.Double"
        }
      ],
      "CLASS_TYPE": "java.lang.Double"
    },
    "RF_RECEIVE_FREQUENCY_RANGE": {
      "entries": [
        {
          "minimum": 34.2,
          "minimumInclusive": true,          816
          "maximum": 1754.2,
          "maximumInclusive": true,
          "CLASS_TYPE": "java.lang.Double"
        }
      ],
      "CLASS_TYPE": "java.lang.Double"
    },
```

```
"RF_TRANSMIT_POWER_RANGE": {
  "entries": [
    {
      "minimum": 0.0,
      "minimumInclusive": true,           ⎫
      "maximum": 35.4,                    ⎬─818
      "maximumInclusive": true,           ⎪
      "CLASS_TYPE": "java.lang.Double"    ⎭
    }
  ],
  "CLASS_TYPE": "java.lang.Double"
},
"RF_RECEIVE_POWER_RANGE": {
  "entries": [
    {
      "minimum": 0.0,
      "minimumInclusive": true,           ⎫
      "maximum": 35.4,                    ⎬─820
      "maximumInclusive": true,           ⎪
      "CLASS_TYPE": "java.lang.Double"    ⎭
    }
  ],
  "CLASS_TYPE": "java.lang.Double"
},
"RF_SAMPLE_RATES": {
  "values": [
    0.1,
    0.25,
    1.024,
    1.536,
    1.792,
    1.92,          ─822
    2.048,
    2.16,
    2.56,
    2.88,
    3.2,
    4.2,
    65.0
  ],
  "CLASS_TYPE": "java.lang.Double"
},
```

FIG. 8B

```
"RF_MODULATIONS": {
    "values": {                                    ⌐─── 824
        "QAM",
        "QPSK"
    },
    "CLASS_TYPE": "java.lang.String"
},
"guidanceParameters": [
    {
        "name": "P_SUCCESS",
        "gpType": "HIGH_VALUE_PARAM",              ⌐─── 826
        "gp": 95
    },
    {
        "name": "P_DETECTION",
        "gpType": "LOW_VALUE_PARAM",
        "gp": 0
    },
    {
        "name": "P_COLLATERAL_DAMAGE",
        "gpType": "LOW_VALUE_PARAM",
        "gp": 0
    },
    {
        "name": "P_ATTRIBUTION",
        "gpType": "LOW_VALUE_PARAM",
        "gp": 0
    }
]
}
```

FIG. 8C

METHOD AND APPARATUS FOR SELECTING A RESOURCE FOR CONNECTING TO A SPACE VEHICLE

BACKGROUND

Satellites are used for many military and civilian purposes. Satellites are frequently used for navigation, reconnaissance, relaying of communications, and tracking the weather. A satellite typically carries radio equipment for connecting to a ground station. The ground station may be positioned between the satellite and one or more operator terminals, and it may be configured to relay data between the satellite and the operator terminals.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the disclosure.

According to aspects of the disclosure, a method is provided, comprising: receiving a search query for resources that are configured to establish a connection with a space vehicle, the search query including a first value for a connection parameter; identifying one or more tactic definitions that satisfy the search query, each of the tactic definitions including one or more second values for the connection parameter, wherein at least one of the second values for the connection parameter matches the first value for the connection parameter that is included in the search query; generating one or more tactic options, each of the tactic options being generated based on a respective one of the tactic definitions, each of the tactic options being associated with a respective resource of the tactic option, the respective resource of the tactic option being one that is compatible with the tactic definition used as a basis for generating the tactic option; and returning at least one of the tactic options in response to the search query.

According to aspects of the disclosure, a system is provided, comprising: a memory; and at least one processor operatively coupled to the memory, the at least one processor being configured to perform the operations of: receiving a search query for resources that are configured to establish a connection with a space vehicle, the search query including a first value for a connection parameter; identifying one or more tactic definitions that satisfy the search query, each of the tactic definitions including one or more second values for the connection parameter, wherein at least one of the second values for the connection parameter matches the first value for the connection parameter that is included in the search query; generating one or more tactic options, each of the tactic options being generated based on a respective one of the tactic definitions, each of the tactic options being associated with a respective resource of the tactic option, the respective resource of the tactic option being one that is compatible with the tactic definition used as a basis for generating the tactic option; and returning at least one of the tactic options in response to the search query.

According to aspects of the disclosure, a non-transitory computer-readable medium is provided that stores one or more processor-executable instructions, which when executed by at least one processor cause the at least one processor to perform the operations of: receiving a search query for resources that are configured to establish a connection with a space vehicle, the search query including a first value for a connection parameter; identifying one or more tactic definitions that satisfy the search query, each of the tactic definitions including one or more second values for the connection parameter, wherein at least one of the second values for the connection parameter matches the first value for the connection parameter that is included in the search query; generating one or more tactic options, each of the tactic options being generated based on a respective one of the tactic definitions, each of the tactic options being associated with a respective resource of the tactic option, the respective resource of the tactic option being one that is compatible with the tactic definition used as a basis for generating the tactic option; and returning at least one of the tactic options in response to the search query.

BRIEF DESCRIPTION OF THE DRAWING

Other aspects, features, and advantages of the claimed disclosure will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 1 is a diagram of an example of a system, according to aspects of the disclosure;

FIG. 4 is a diagram of an example of a user interface, according to aspects of the disclosure;

FIG. 7 is a diagram of an example of a resource definition, according to aspects of the disclosure;

FIG. 8A is a diagram of an example of a tactic definition, according to aspects of the disclosure;

FIG. 8B is a diagram of an example of a tactic definition, according to aspects of the disclosure;

FIG. 8C is a diagram of an example of a tactic definition, according to aspects of the disclosure;

DETAILED DESCRIPTION

Figure 1:
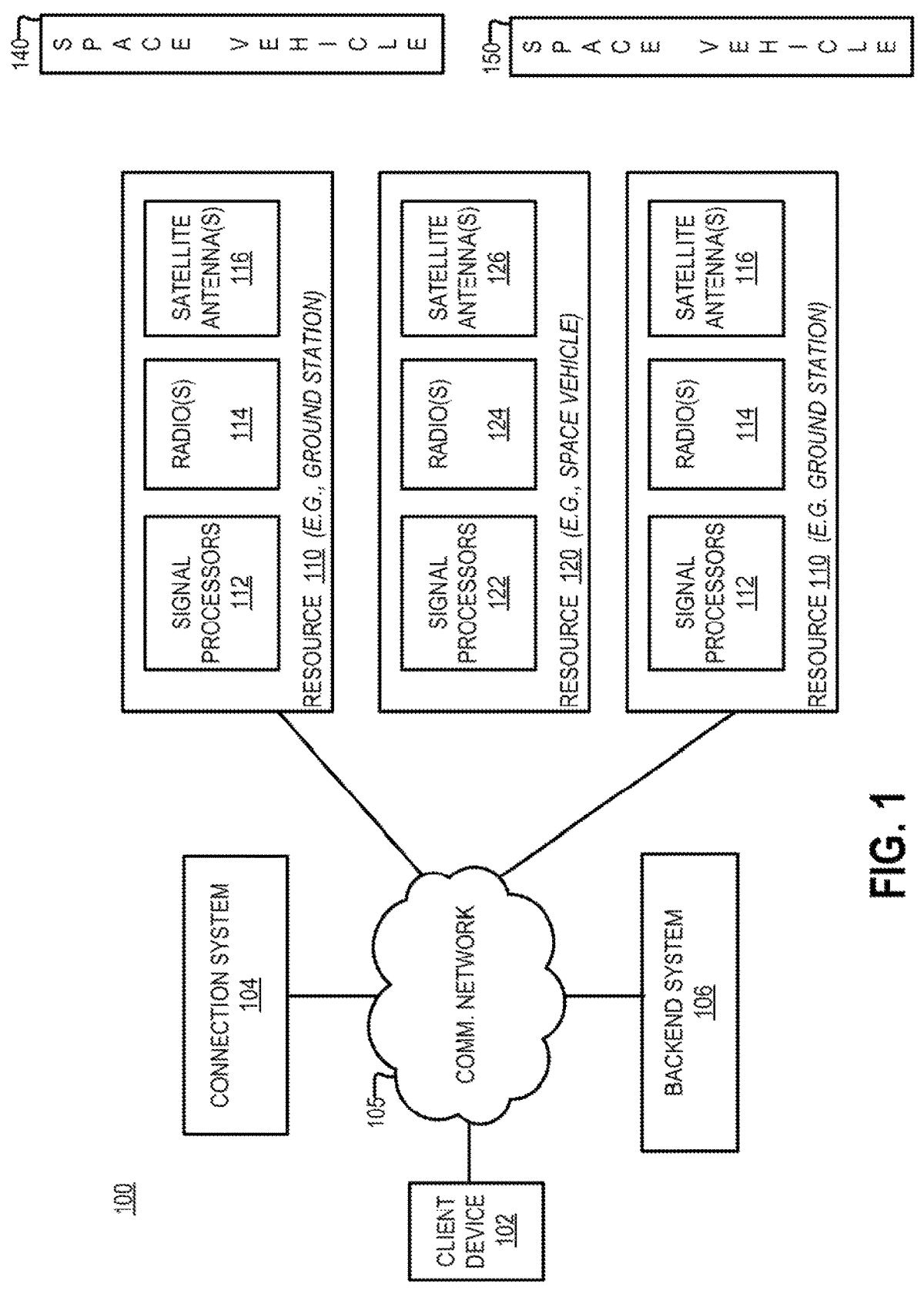
Figure 2:
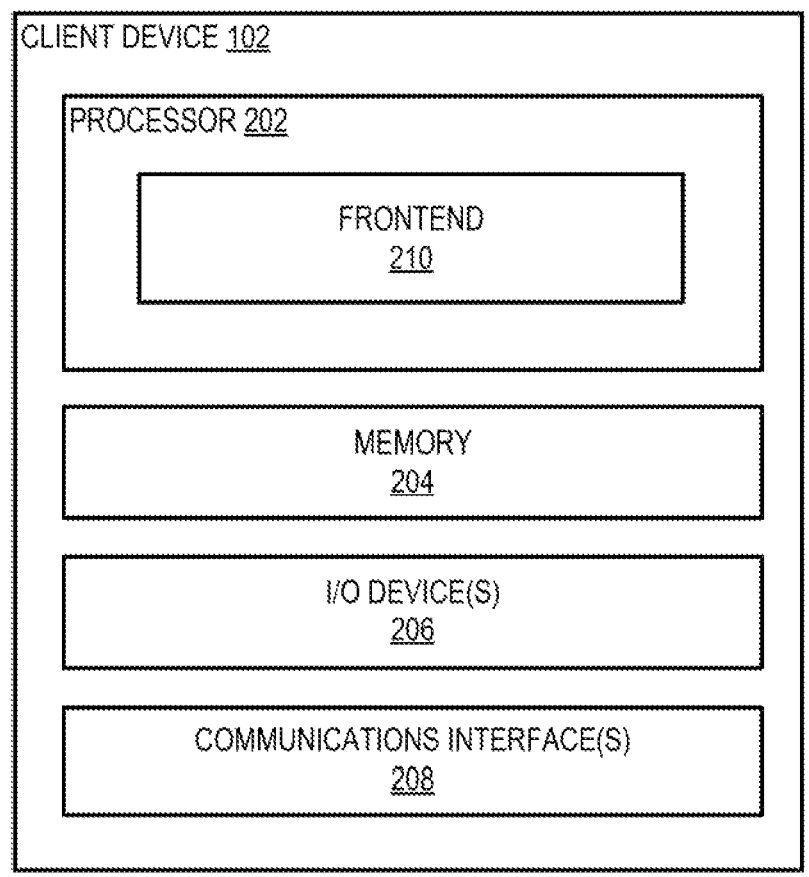
FIG. 2 is a diagram of an example of a client device, according to aspects of the disclosure.

FIG. 1 is a diagram of an example of a system 100, according to aspects of the disclosure. As illustrated, the system 100 may include a client device 102, a connection system 104, a backend system 106, a communications network 105, space vehicles 140-150, and resources 110-120 for connecting to the space vehicles 140-150.

In operation, the client device 102 may receive a user input specifying a search query that identifies a space vehicle (e.g., one of the space vehicles 140-150) and one or more connection parameters. The client device 102 may then provide the search query to the backend system 106. In response to the search query, the client device 102 may receive from the backend system 106 a plurality of tactic options. Each tactic option may identify a resource (e.g., any of resources 110-120) for connecting to the space vehicle identified in the search query. The user of the client device 102 may select one of the tactic options, and the client device may establish a connection with the space vehicle in accordance with the selected tactic option.

Conventional systems for satellite communication are purpose-built. They are designed for use with a specific satellite (or group of satellites). Conventionally, if one wants to communicate with a specific satellite, they may be forced to use a purpose-built communication system that is designed for that satellite specifically. However, with the proliferation of satellite technologies, it has become possible to cross-use different systems for satellite communication. The term "cross-use" refers to the idea of using a system for satellite communication to communicate with a satellite with which the system has not been deliberately designed to communicate, but which is otherwise compatible with the system.

The system 100, which is shown in FIG. 1, is arranged to facilitate the cross-use of systems for satellite communication. Namely, the system 100 is arranged to receive a search query that identifies connection parameters, search a pool of available resources to determine which resources can perform the communication (in accordance with the connection parameters specified by the search query), and identify those resources to a user (e.g., a satellite operator). In some respects, the system 100 is advantageous because it can expand the pool of resources that are available to the user for establishing a connection with a satellite or another space vehicle.

The client device 102, the connection system 104, and the backend system 106 may be coupled to one another via the communications network 105. The communications network 105 may include one or more of, such as a local area network (LAN), a wide area network (WAN), the Internet, a wireless communications network, a closed network, and/or any other suitable type of communications network.

Each of the resources 110 may include a ground station for satellite communication. As such, each resource 110 may include a respective set of one or more satellite antennas 116, a respective set of one or more radios 114, and a respective set of one or more signal processors 112. The resource 120 may include a space vehicle (e.g., a satellite or another type of space vehicle). The resource 120 may include a respective set of one or more satellite antenna(s) 126, a respective set of one or more radios 124, and a respective set of one or more signal processors 122. The connection system 104 may include a computing system and/or an electronic system that is arranged to cause any of the resources 110-120 to establish a connection (e.g., an uplink connection and/or a downlink connection) with a space vehicle, such as one of the space vehicles 140-150.

Although the system 100 is depicted as including two resources 120, it will be understood that the system 100 may include any number of resources 110 (e.g., 1 resource, 5 resources, tens of resources 110, hundreds of resources 110, or thousands of resources 120). Although in the example of FIG. 1, the connection system 104 and the backend system 106 are depicted as separate systems, it will be understood that in some implementations they may be integrated into the same system. Although in the example of FIG. 1 the client device 102 is depicted as being separate of the connection system 104 and the backend system 106, it will be understood that in some implementations the client device 102 may be integrated into one (or both) of the connection system 104 and the backend system 106. Furthermore, it will be understood that the connection system 104 and the backend system 106 may also be integrated together into the same system.

FIG. 2 illustrates the client device 102 in further detail, according to aspects of the disclosure. As illustrated, the client device 102 may include a processor 202, a memory 204, one or more input-output (I/O) devices 206, and one or more communications interface(s) 208. The processor 202 may include one or more of a general-purpose processor (e.g., an x86-based processor or an ARM-based processor), a special-purpose processor, an application-specific integrated circuit (ASIC), a field-programmable gate array (FPGA), and/or any other suitable type of processing circuitry. The memory 204 may include any suitable type of volatile or non-volatile memory. By way of example, the memory 204 may include one or more of a flash memory, an Electrically Erasable Programmable Read-Only Memory (EEPROM), a Synchronous Dynamic Random-Access Memory (SDRAM), a solid-state drive (SSD), and/or any other suitable type of memory. The I/O device(s) 206 may include one or more of a keyboard, a display device, a touchscreen, a mouse, a keyboard, a microphone, a speaker, and/or any other suitable type of I/O device. The communications interface(s) 208 may include one or more of an Ethernet interface, a Bluetooth Interface, an InfiniBand Interface, and/or any suitable type of communications interface.

The processor 202 may be configured to execute a frontend 210. The operation of the frontend 210 is discussed further below with respect to FIGS. 3-5D. Although in the present example the frontend 210 is implemented in software, alternative implementations are possible in which the frontend 210 is implemented in hardware or as a combination of software and hardware.

Figure 3:
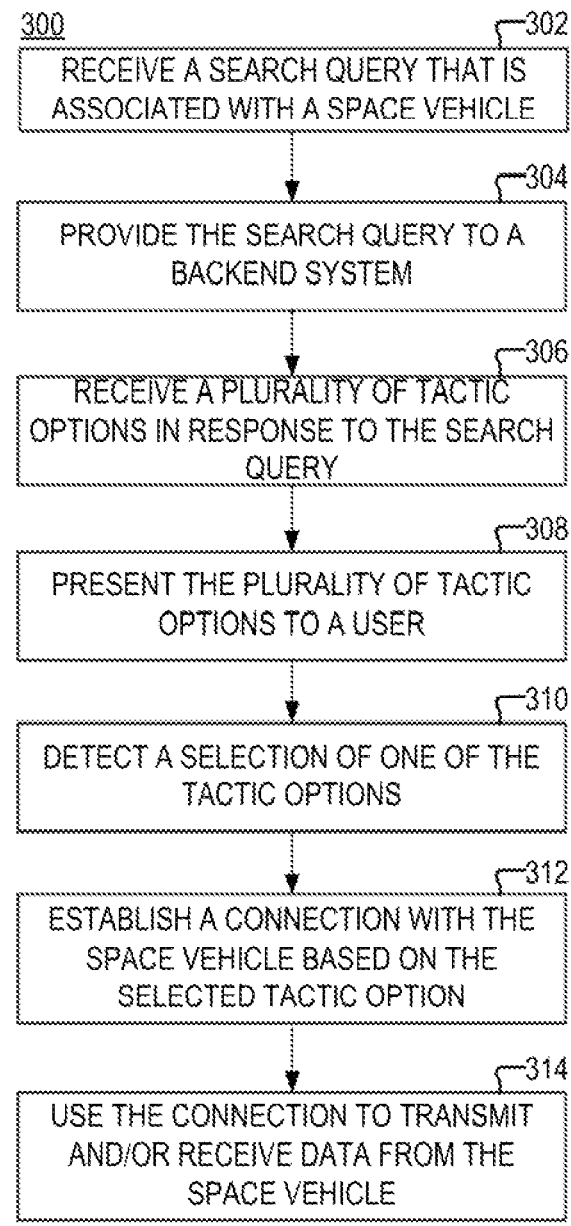
FIG. 3 is a flowchart of an example of a process, according to aspects of the disclosure.

FIG. 3 is a flowchart of an example of a process 300 that is performed by the frontend 210, according to aspects of the disclosure.

At step 302, the frontend 210 receives a search query that is input into the client device 102 via any of the input device(s) 206. The search query may identify a space vehicle (e.g., one of the space vehicles 140 and 150, etc.) with which a connection is desired to be established. The search query may also identify one or more parameters of the connection. By way of example, the one or more parameters may include any of: (i) a time window in which the connection is desired to be established, (ii) receive frequency, (iii) receive sampling rate, (iv) receive power, (v) uplink modulation, (vi) transmit frequency, (vii) transmit power, (viii) transmit sampling rate, and (ix) downlink modulation. In some implementations, at step 302, the frontend 210 may display (on a display device, such as the I/O device 206) a user interface 400, and receive the search query via the user interface 400. The user interface 400 is discussed in further detail with respect to FIG. 4.

At step 304, the frontend 210 provides the search query to the backend system 106.

At step 306, the frontend 210 receives a plurality of tactic options that are generated by the backend system 106 in response to the search query. Each of the tactic options may identify a specific resource that can be used for establishing the connection with the space vehicle, as well as one or more parameters for establishing the connection. According to the present example, the plurality of tactic options includes tactic options 510A-C, which are discussed further below with respect to FIGS. 5A-D.

At step 308, the frontend 210 presents the plurality of tactic options to a user. In some implementations, at step 302, the frontend 210 may display (on a display device, such as the I/O device 206) a user interface 500, and render the tactic options in the user interface 500. The user interface 500 is discussed in further detail with respect to FIGS. 5A-D.

At step 310, the frontend 210 detects a selection of one of the tactic options. According to the present example, the tactic option is selected by the user clicking on the tactic option. However, the present disclosure is not limited to any specific method for selecting a tactic option At step 312, the frontend 210 establishes a connection with the space vehicle (identified in the search query) based on the selected tactic option. In some implementations, establishing the connection may include scheduling the connection as a task in a scheduling system, after which the connection is initiated via scheduled task execution. Additionally or alternatively, in some implementations, establishing the connection with the space vehicle includes providing the tactic option to the connection system 104. Upon, receiving the tactic option, the connection system 104 may configure a resource that is identified in the tactic option to establish a connection with the space vehicle in accordance with one or more connection parameters that are identified in the tactic option.

At step 314, the client device 102 (or another computing device) receives and/or transmits information to the space vehicle. The information may be transmitted and/or received over the connection (established at step 312). The information may be transmitted and/or received via the resource that is associated with the tactic option (selected at step 310).

As used throughout the disclosure, the phrase "establishing a connection in accordance with a tactic option" shall mean "establish a connection in accordance with one or more connection parameters that are identified in (or otherwise associated with) the tactic option." For example, when a tactic option specifies a time window for establishing a connection, establishing the connection in accordance with the tactic option may include establishing the connection during the specified time window. As another example, when a tactic option identifies one or more receive or transmit frequencies, establishing the connection in accordance with the tactic option may include establishing the connection by using only receive and/or transmit frequencies that are specified in the tactic option. As another example, when a tactic option identifies one or more transmit sampling rates, establishing the connection in accordance with the tactic option may include establishing a connection in which all transmitted data has one of the sampling rates specified in the tactic option. As another example, when a tactic option identifies one or receive sampling rates, establishing the connection in accordance with the tactic option may include establishing a connection in which all received data has one of the sampling rates specified in the tactic option. As another example, when a tactic option specifies modulation schemes (for received or transmitted data), establishing the connection in accordance with the tactic option may include establishing a connection in which all transmitted data is modulated in accordance with a modulation scheme that is specified by the tactic option and/or establishing a connection in which all received data is modulated in accordance with a modulation scheme that is identified in the tactic option.

FIG. 4 is a diagram of an example of a user interface 400 for specifying a search query, according to aspects of the disclosure. The search query that is specified via the user interface 400 may be the same or similar to the search query received at step 302 of the process 300 (shown in FIG. 3). In other words, the search query received at step 302 may include the information that is specified in all (or at least one) of the fields of the user interface 400.

According to the example of FIG. 4, the user interface 400 includes fields 402-414. Under the nomenclature of the present disclosure, any data item that is input via one of fields 402-414 is considered to be a connection parameter. Field 402 may include a text input field for inputting the identifier of a space vehicle with which a connection is desired to be established. Field 404 may include a text input field for specifying a type of radio that is desired to be used for the connection. In the example of FIG. 4, field 404 specifies that a Lime™ radio is desired to be used for the connection. However, examples of other types of radios that can be selected (or specified) in field 404 include Ettus™, Pluto™, RTLSDR™, and ASP Lite™. It will be understood that the present disclosure is not limited to any specific type of radio being specified via field 404. In some implementations, field 404 may be omitted. In such implementations, if no resource/radio is specified in the user interface 400, tactic options that are returned in response to the search query would identify whatever resources/radios satisfy the other RF criteria (or connection parameters) that are specified in the search query.

Field 406 may include one or more text input fields for specifying a time window during which the connection is desired to be established. As illustrated, field 406 may include text input fields for specifying the time window in terms of a start time of the connection, a start date of the connection, an end time of the connection, an end date of the connection, and a duration of the connection. However, the present disclosure is not limited to any specific method for defining a time window during which the connection is desired to be established.

Field 408 may include a text input field for specifying a type of connection to the space vehicle. Specifically, field 408 may allow the user to specify one of three possible types of connection—namely: (i) a connection that is used only for the transmission of data, but not for receiving data, (ii) a connection is used only for the receiving of data, but not for the transmission of data, and (iii) a connection that is used both for the transmission and reception of data. Although three specific connection types are discussed in this example, it will be understood that the present disclosure is not limited to any specific type of connection being specified in the field 408.

Field 410 may include one or more text input fields for specifying different receive parameters for the connection. As illustrated, field 410 may include text input fields for specifying a frequency of the signal that is received from the space vehicle over the course of the connection (e.g., receive frequency, etc.), the gain of the signal that is received from the space vehicle over the course of the connection (e.g., receive gain, etc.), the sampling rate of the signal that is received from the space vehicle over the connection (e.g., receive sampling rate, etc.), and the planned power of the signal that is received from the space vehicle over the course of the connection (e.g., receive power, etc.).

Field 412 may include one or more text input fields for specifying different transmit parameters for the connection.

As illustrated, field 412 may include text input fields for specifying a frequency of the signal that is transmitted to the space vehicle over the course of the connection (e.g., transmit frequency, etc.), the gain of the signal that is transmitted from the space vehicle over the course of the connection (e.g., transmit gain, etc.), the sampling rate of the signal that is transmitted to the space vehicle over the connection (e.g., transmit sampling rate, etc.), and the planned power of the signal that is transmitted to the space vehicle over the course of the connection (e.g., transmit power, etc.).

Field 414 may include a text output field for specifying the maximum power for the signal that is transmitted to the space vehicle over the course of the connection. Field 416 may include a text output field for specifying the maximum power of signals that are received from the space vehicle. The values of fields 414 and 416 may be obtained from a file or database that specifies the maximum received/transmitted power for one or more space vehicles. In some implementations, the values of fields 414 and 416 may be specified by a commander or another person above the level of the user of the interface 400. The maximum power values displayed in fields 414 and 46 may be used as guidance on what not to exceed when entering inputs in the interface 400.

Field 418 may be an output field that identifies the values of one or more commander guidance parameters. The values of the commander guidance parameter are retrieved from a database, and they may be specified by a commander. In the example of FIG. 4, unlike the values of fields 404-412, the values of the commander guidance parameters are not specified by the operator of the client device 102. However, alternative implementations are possible in which the values of the commander guidance parameters are specified via input fields, by the operator of the client device 102.

Examples of commander guidance parameters include probability of success, probability of detection, collateral damage, and attribution. Probability of success refers to the probability that tactic option would succeed if attempted. Success may include successfully establishing a connection based on the tactic option, successfully receiving a signal based on the tactic option, successfully transmitting a signal based on the tactic option, etc. Probability of detection refers to the probability of detection of radio emissions that are performed as part of the connection. Attribution refers to the probability of attributing an action taken by a resource (e.g., a transmission of a signal to a space vehicle or receiving a signal from the space vehicle) to a user of the system 100. And probability of collateral damage refers to the probability of damage to surrounding actors due to action(s) taken by a resource over the course of executing the tactic option. FIG. 4 is provided as an example only.

It will be understood that the commander guidance parameters in field 418 are provided as an example only, and the present disclosure is not limited to any specific type of commander guidance parameter. Further example of commander guidance parameters include cost or percent degradation of equipment (used for establishing a connection to a space vehicle) that is at least in part caused as a result of the connection being established. By way of example, a commander guidance parameter may be any indication of a characteristic of what a successful mission will look like in its end state. The mission may be any mission which, at least in part, involves establishing a connection with a space vehicle by using the system 100. Depending on the context in which the system 100 is used, the connection parameters used for a particular connection which would enable successful adherence to Commander's Guidance may differ based on the guidance received and the capability of the lower echelons (e.g., the operators of the system 100) as they implement that guidance to efficiently use their assets or resources (e.g., resources for connecting to a space vehicle).

Although in the example of FIG. 4 each of the fields in the user interface 400 is an input field, alternative implementations are possible in which any of the fields in the user interface 400 is replaced with any other suitable type of input component (e.g., a checkbox, a checkbox menu, a radio button, a radio button menu, a slider, a dropdown menu, etc.).

Figure 5A:
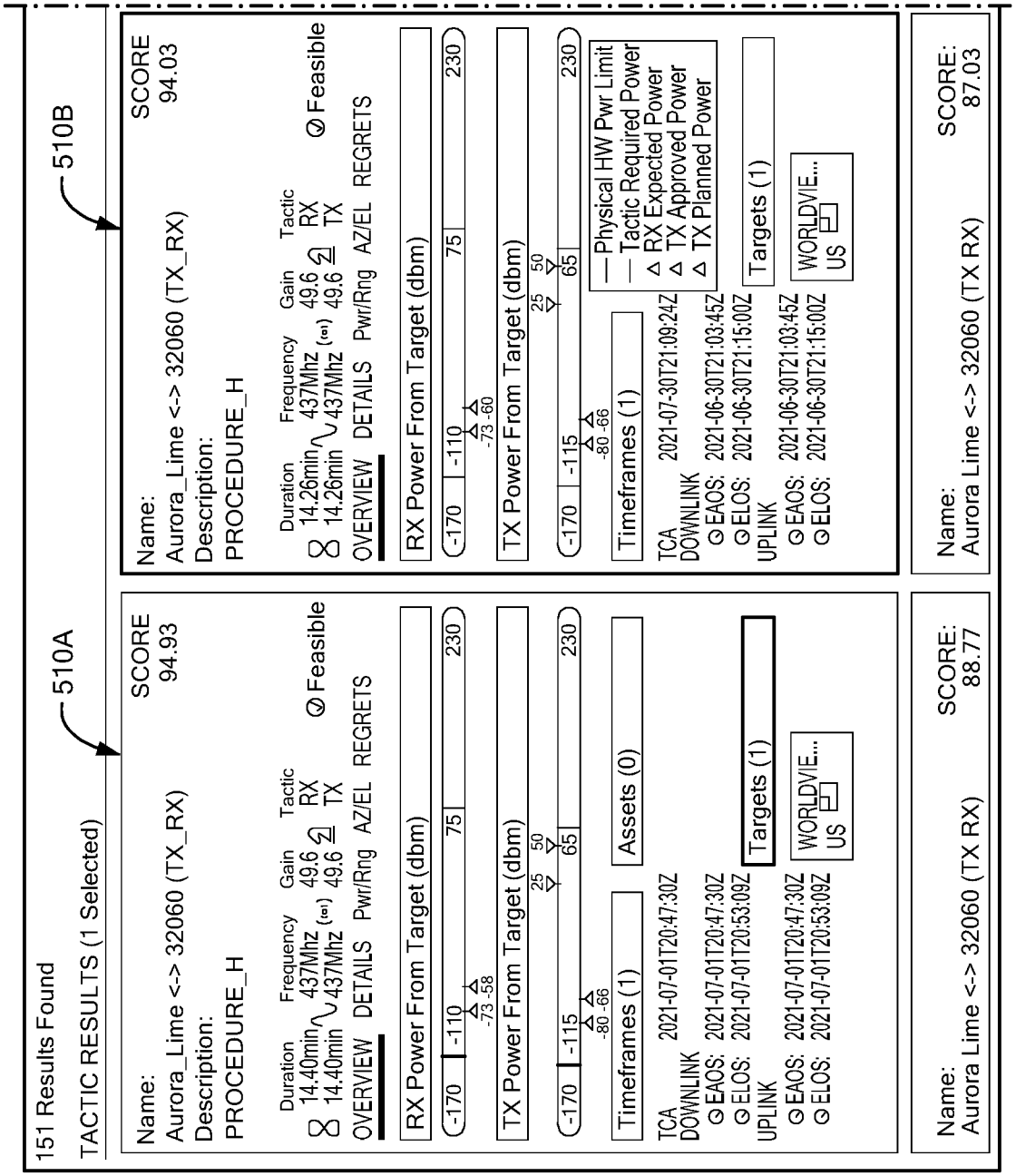
FIG. 5A is a diagram of an example of a user interface, according to aspects of the disclosure.
Figure 5A:
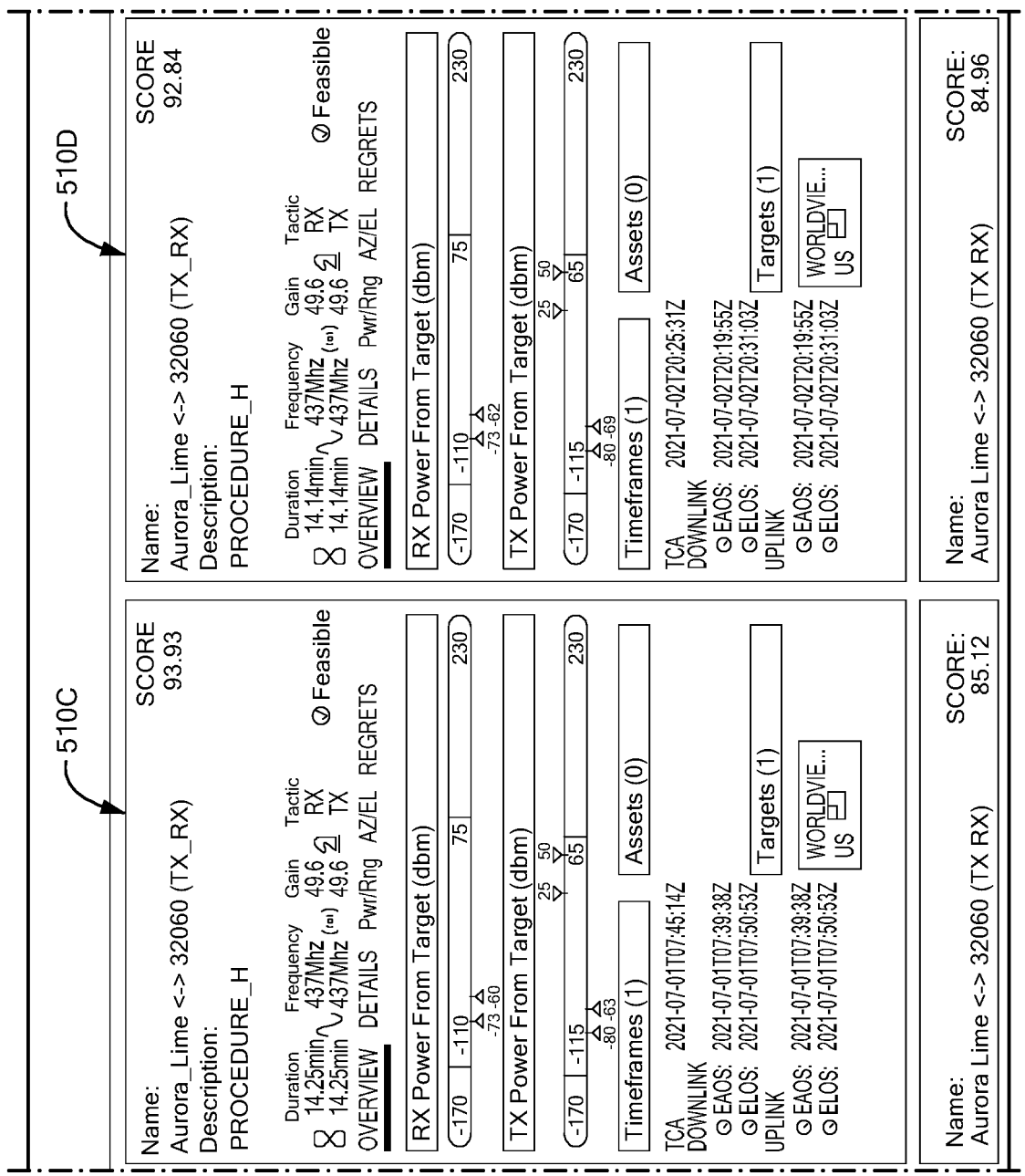
Figure 5A:
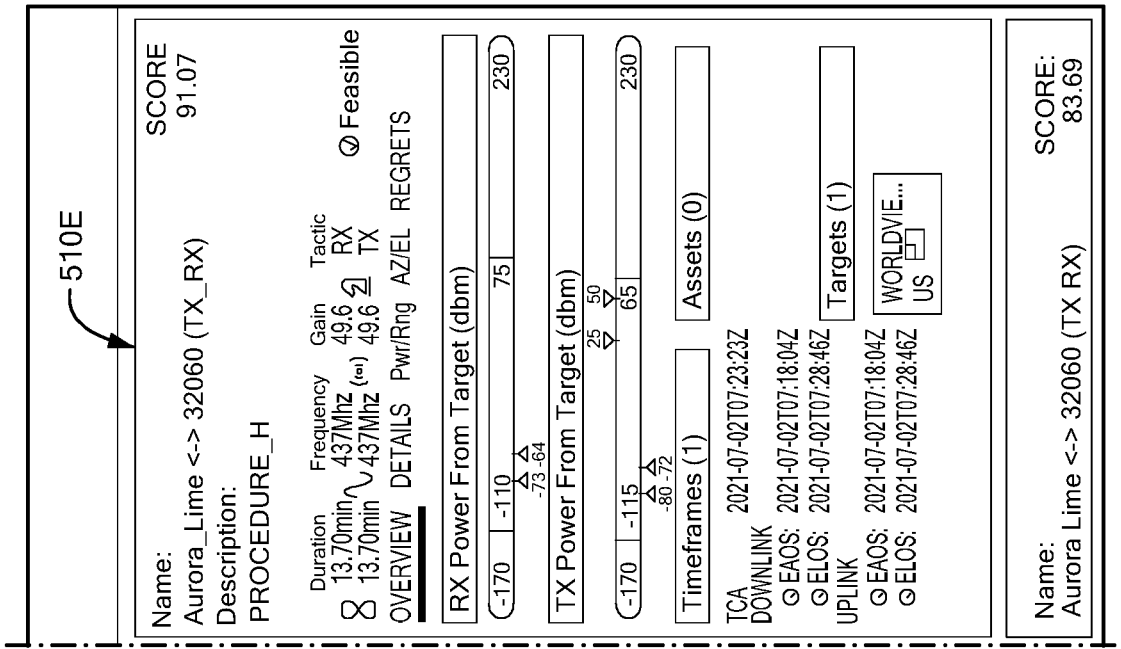

FIG. 5A is a diagram of an example of a user interface 500, according to aspects of the disclosure. As noted above, the user interface 500 may be displayed at step 308 of the process 300 (shown in FIG. 3). The user interface 500 may include a plurality of tactic options 510A-E, which, as noted above, are received in response to the search query transmitted at step 304 (shown in FIG. 3). In some implementations, the user of the client device 102 may select one or more of the tactic options 510A-E by clicking on it. When a tactic option is selected, it may be used to establish a connection with a space vehicle (i.e., the space vehicle associated with the search query received at step 302). Using a tactic option to establish a connection with the space vehicle may include establishing the connection by: (i) using a resource that is associated with the tactic option, and (ii) in accordance with one or more connection parameters that are part of the tactic option. As is discussed further below, such connection parameters may include a time window for the connection (e.g., a time window during which the space vehicle would be visible to the resource that is associated with the tactic option), transmit power, receive power, transmit frequency, receive frequency, etc. It will be understood that FIG. 5A is provided as an example only, and the present disclosure is not limited to any specific method for rendering tactic options that are returned by the backend system 106.

Figure 5B:
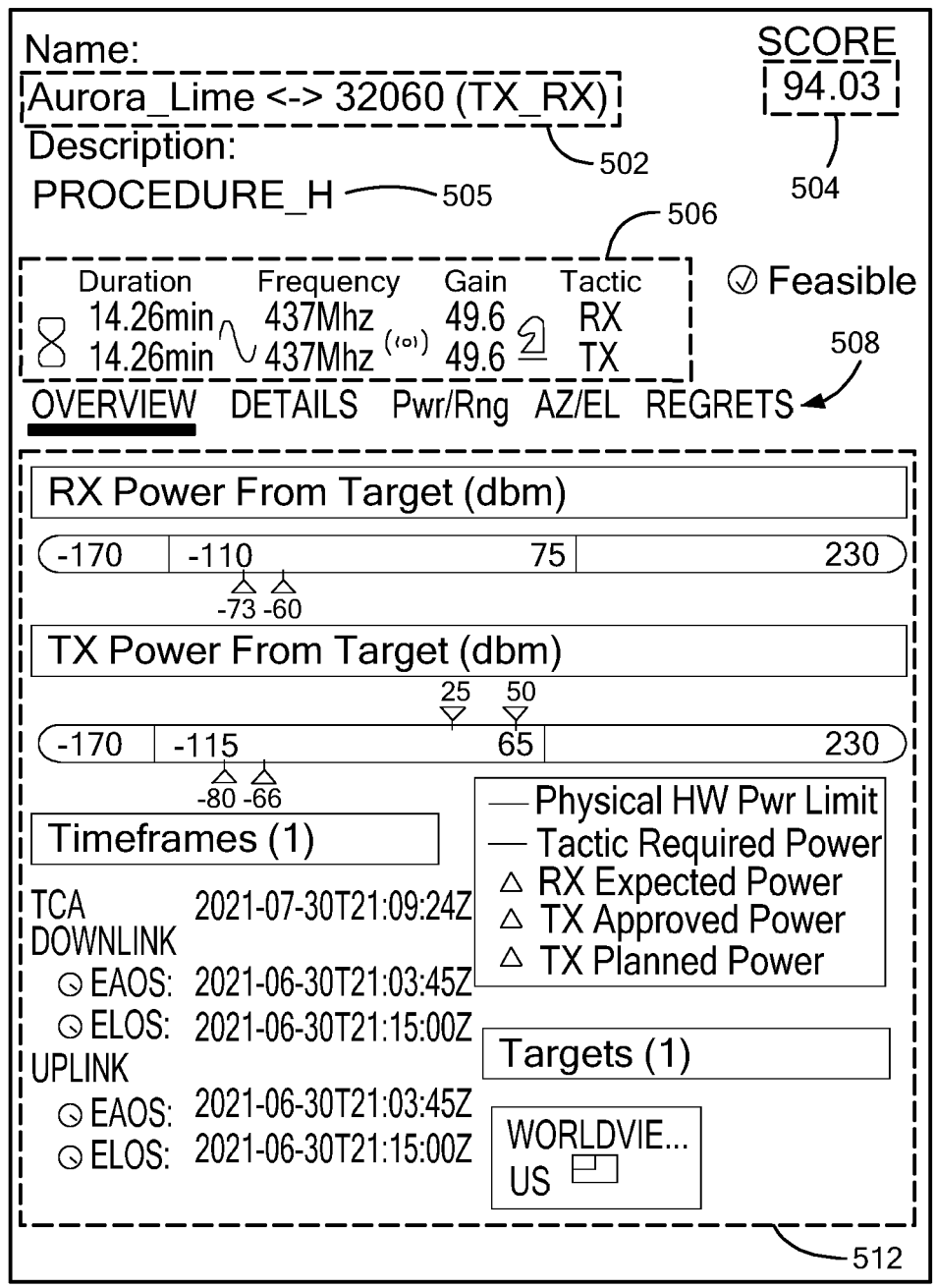
FIG. 5B is a diagram of an example of a tactic option representation, according to aspects of the disclosure.

FIG. 5B is a diagram of the tactic option 510B, according to aspects of the disclosure. As illustrated, tactic option 510B may include a resource identifier (not shown) along with a target identifier 502. The resource identifier may identify a resource that can be used to establish the connection associated with the search query (received at step 302). The target identifier may identify a space vehicle with which a connection is desired to be established. In the example of FIG. 5, the target identifier 502 indicates that a transmit-receive connection is desired to be established with a space vehicle having NORAD ID 32060.

Tactic option 510B may include a compatibility score 504. The compatibility score 504 may identify the degree to which tactic option 510B satisfies the search query (received at step 302). The manner in which the compatibility score is calculated is discussed further below with respect to FIGS. 9-10.

Tactic option 510B may include a field 506, which identifies various connection parameters that are part of (or otherwise associated with) tactic option 510B. In the present example, field 510 B indicates that the tactic option may be used to establish a connection that has: an uplink duration of 14.26 min, uplink (or transmit) frequency of 437 MHz, uplink (or transmit) gain of 49.6, downlink duration of 14.26 min, downlink (or receive) frequency of 437 MHz, and downlink (or receive) gain of 49.6. The uplink duration may be a time interval of the opportunity (or visibility) for tactic option 510B, meaning when there is line of sight to the target, applicable to both uplinking and downlinking. In the present example, a ground station (i.e. the resource associated with tactic option 510B) has visibility to the target for 14.26 minutes, essentially this is the time frame in which the target rises and is visible over the horizon and then sets for visibility to be lost over the horizon.

Tactic option 510B may include a menu 508 and a pane 512. The contents of pane 512 may vary depending on which option in the menu 508 is selected. FIG. 5B illustrates the contents of pane 512 when the "overview" option of the menu 508 is selected. Pane 512 indicates that tactic option 510B may be used to establish a connection having transmit power anywhere in the range of −110 dBm-75 dBm, but expected to have transmit power in the range −73 dBm to 60 dBm. Pane 512 further indicates that tactic option 510B may be used to establish a connection having receive power anywhere in the range of −110 dBm-75 dBm, but expected to have receive power in the range −73 dmb to 60 dBm. Pane 512 may also include information regarding the estimated acquisition of signal (EAOS) and estimated loss of signal (ELOS) of an uplink channel that is part of the connection (and which can be established by using tactic option 510B), and the EAOS and ELOS of the downlink channel of the connection (and which can be established by using tactic option 510B). A signal can be transmitted or received successfully between the EAOS and ELOS times (for transmission and reception). The difference between these 2 times would typically be less than the duration of the tactic option 510B (e.g., the uplink and/or downlink duration). It's between the ELOS and ELOS times that uplinking and downlinking can successfully occur.

Figure 5C:
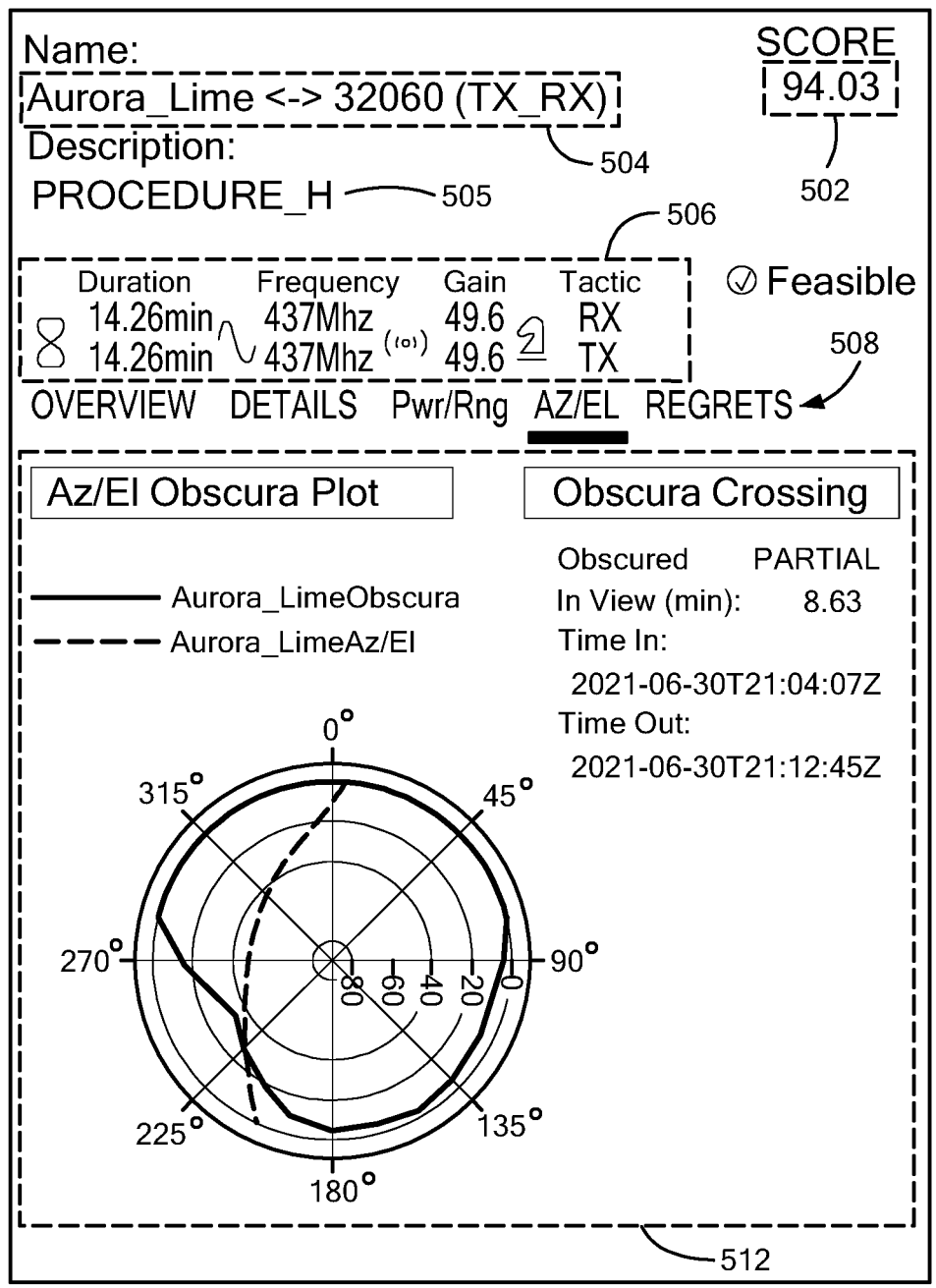
FIG. 5C is a diagram of an example of a tactic option representation, according to aspects of the disclosure.

FIG. 5C shows the contents of pane 512 when an Azimuth/Elevation (AZ/EL) option of the menu 508 is selected. As illustrated, when the AZ/EL option is selected, the pane 512 may show the azimuth and elevation of an antenna during a connection with the target space vehicle of the search query (transmitted at step 304). The AZ/EL option may be omitted in situations in which the search query concerns a connection between two different space vehicles. The AZ/EL option may be present only in situations in which a ground-to-space connection is being requested by the search query.

Figure 5D:
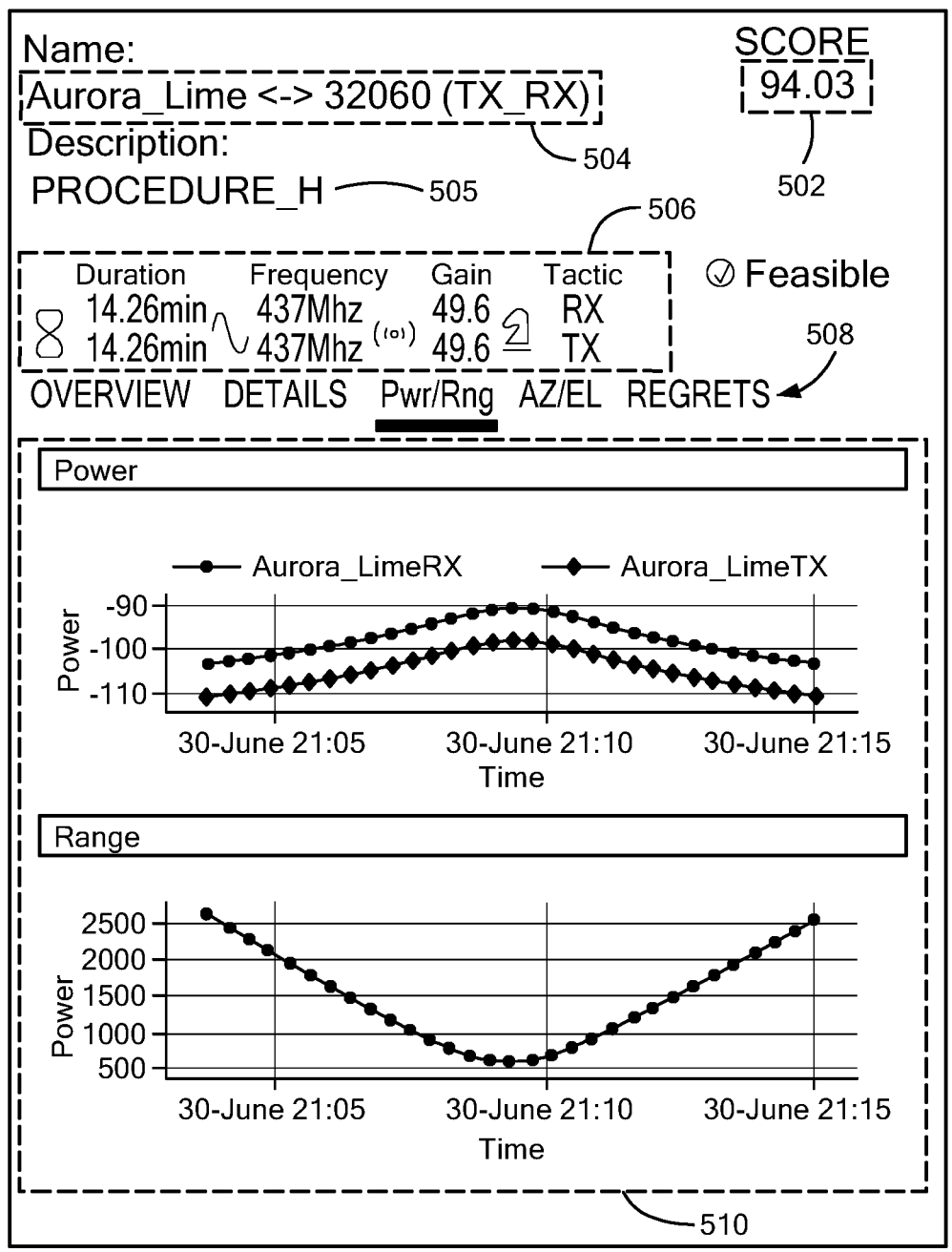
FIG. 5D is a diagram of an example of a tactic option representation, according to aspects of the disclosure.

FIG. 5D shows the contents of pane 512 when a power/range (Pwr/Rng) option of the menu 508 is selected. As illustrated, when the Pwr/Rng option is selected, pane 512 may include plots that illustrate how the range of the resource (associated with tactic option 510B and relative to the space vehicle associated with the search query received at step 302) varies during the time window for tactic option 510B (i.e., the time window during which tactic option can be used to establish a connection with the space vehicle). Furthermore, when the Pwr/Rng option is selected, pane 512 may include a plot showing the relationship between transmit and/or receive power and range.

Strictly speaking, item 510B, which is shown in FIGS. 5A-D, is a graphical rendition of a tactic option. Graphical interface components, such as the pane 512, are not themselves part of the tactic option. However, any information that is presented in the graphical components is considered to be part of the tactic option. As used throughout the disclosure, and as indicated by context, the term "tactic option" may refer to the tactic option itself or to a rendition of the tactic option.

Figure 6:
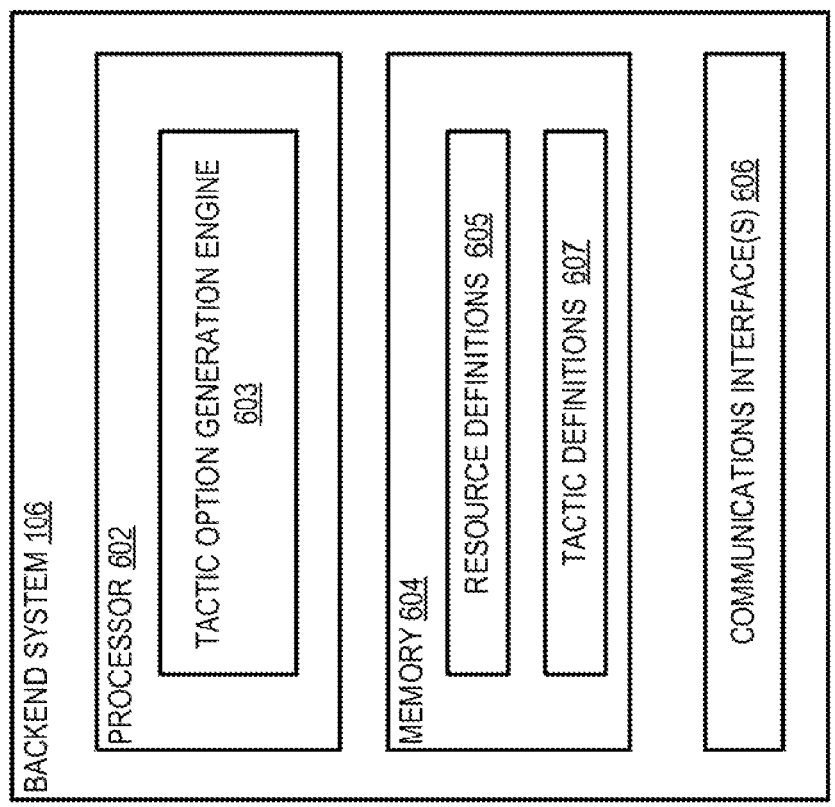
FIG. 6 is a diagram of an example of a backend system, according to aspects of the disclosure.

FIG. 6 is a diagram of the backend system 106, according to aspects of the disclosure. As illustrated, the backend system 106 may include a processor 602, a memory 604, and one or more communications interfaces 606. The processor 602 may include one or more of a general-purpose processor (e.g., an x86-based processor or an ARM-based processor), a special-purpose processor, an application-specific integrated circuit (ASIC), a field-programmable gate array (FPGA), and/or any other suitable type of processing circuitry. The memory 604 may include any suitable type of volatile or non-volatile memory. By way of example, memory 604 may include one or more of a flash memory, an Electrically Erasable Programmable Read-Only Memory (EEPROM), a Synchronous Dynamic Random-Access Memory (SDRAM), a solid-state drive (SSD), and/or any other suitable type of memory. The communications interface(s) 208 may include one or more of an Ethernet interface, a Bluetooth Interface, an InfiniBand Interface, and/or any suitable type of communications interface. Although in the example of FIG. 6 the backend system 106 is an integrated system, it will be understood that in some implementations, the backend system 106 may be a distributed system including a plurality of computing devices that are connected to one another via a communications network (and/or a communications bus). Stated succinctly, the present disclosure is not limited to any specific implementation of the backend system 106.

The processor 602 may be configured to execute a tactic option generation engine 603 (hereinafter "engine 603"). The engine 603 may include software that is configured to receive a search query including one or more parameters for connection to a space vehicle and identify one or more tactic options for connecting to the space vehicle in response to the search query. In some implementations, the engine 603 may be configured to execute processes 900-1000, which are discussed further below with respect to FIGS. 9 and 10, respectively. Although in the example of FIG. 6 the engine 603 is implemented in software, alternative implementations are possible in which the engine 603 is implemented in hardware or as a combination of software and hardware.

The memory 604 may be configured to store one or more resource definitions 605 and one or more tactic definitions 607. Each of the resource definitions 605 may include a descriptor of a different resource for connecting to a space vehicle. As is discussed further below, any of the resource definitions 605 may include an identifier of a respective resource and the capabilities of the resource. In some respects, each of the resource definitions 605 may be a construct by which resources are represented within the backend system 106. Each of the tactic definitions 607 may describe a selection of connection parameter values that can be used in combination with one another. In some respects, each of the tactic definitions may specify a procedure that is promogulated by a commander and/or expects above the level of the operator of the client device 102, which can be used to connect to a space vehicle.

In some respects, the one or more resource definitions 605 may specify what resources are available to connect to a space vehicle. And the one or more tactic definitions 607 may specify the acceptable ways in which any resources (that might be available) can be used. As can be readily appreciated, one may want to limit the manner in which resources are used to prevent interference, to prevent detection, and/or for other similar reasons. Each of the resource definitions 605 may be implemented as text, binary code, one or more objects, one or more files, a portion of an object, a portion of a file, and/or in any suitable manner. Each of the tactic definitions 607 may be implemented as text, binary code, one or more objects, one or more files, a portion of an object, a portion of a file, and/or in any suitable manner.

FIG. 7 is a diagram of an example of a resource definition 700, according to aspects of the disclosure. The resource definition 700 may be the same or similar to any of the resource definitions 605, which are discussed above with respect to FIG. 6. The resource definition 700 may be associated with a specific resource (hereinafter "corresponding resource"). As illustrated, the resource definition 700 may include an identifier of the resource. The resource definition 700 may further include:

(i) an identifier corresponding to the resource and a name of the resource
(ii) an indication of spin-up time associated with the resource
(iii) an indication of a type of the resource; the indication of type may identify whether the resource is a ground-to-space resource or a space-to-space resource; an example of a ground-to-space resource is a satellite ground station; an example of a space-to-space resource is a relay satellite.
(iv) an indication of the type of radio (e.g., receiver) the resource has at its disposal;
(v) a list of frequencies that are supported by the resource;
(vi) a list sampling rates that are supported by the resource;
(vii) an indication of whether an antenna that is part of the resource is steerable
(viii) an indication of transmit power range for the resource;
(ix) an indication of a receive power range for the resource;
(x) an indication of modulation types supported by the resource;
(xi) an indication of power capacity of the antenna of the resource;
(xii) one or more obscura identifiers; each of the obscure identifiers may identify a different obstacle, which the resource can be blocked by; for example the obscura identifiers may identify a mountain range that is to the east of the resource.
(xiii) an indication of a software-defined radio (SDR) transmission filter bandwidth;
(xiv) an indication of an SDR reception filter bandwidth;
(xv) an indication of an SDR format that is supported by a software radio of the resource;
(xvi) an indication of an SDR transmission gain range of a software radio of the resource;
(xvii) an indication of an SDR reception range of a software radio of the resource
(xviii) an indication on SDR channel of the resource FIGS. 8A-C show an example of a tactic definition 800, according to aspects of the disclosure. The tactic definition 800 may be the same or similar to any of the tactic definitions 607, which are discussed above with respect to FIG. 6. As illustrated, the tactic definition may include portions 806-838. Portion 806 may identify the type of the tactic definition 800 or the type of the connection, which the tactic definition 800 can be used to establish. Portion 808 may identify the value of a minimum downlink link margin threshold and a minimum uplink link margin threshold. Portion 810 may identify a receive power capacity range that is compatible with the tactic definition 800. Portion 812 may identify a transmit power capacity range that is compatible with the tactic definition 800. Portion 814 may identify a transmit frequency range that is compatible with the tactic definition 800. Portion 816 may identify a receive frequency range that is compatible with the tactic definition 800. Portion 818 may identify a receive power range that is compatible with the tactic definition 800. Portion 820 may identify a transmit power range that is compatible with the tactic definition 800. Portion 822 may include a list of one or more sampling rates that are compatible with the tactic definition 800. Portion 824 may include a list of one or more modulation schemes that are compatible with the tactic.

In some respects, portions 806-824 provide values or ranges for different types of connection parameters, which must be used by a connection that is established based on the tactic definition (i.e., based on a tactic option that is derived from the tactic definition). As is discussed below, the tactic definition 800 may be used to generate a tactic option, and the tactic option may be used to establish a connection to a space vehicle. For instance, portion 822 identifies a list of sampling rates. When a tactic option is generated based on the tactic definition, the contents of portion 822 will be fully or partially incorporated into the tactic option. As a result, any connection that is established by using the tactic option will be limited to using (1) any of the listed sampling rates or (2) a sampling rate that is provided in the search query. As another example, portion 824 identifies a list of modulation schemes, which consists of "QAM" and "QSPK". When a tactic option is generated based on the tactic definition, the contents of field 822 will be incorporated into the tactic option. As a result, any connection that is established by using the tactic option would be limited to using either QSPK or QAM modulation. As yet another example, portion 814 identifies a transmit frequency range. When a tactic option is generated based on the tactic definition, the contents of portion 814 will be incorporated into the tactic option. As a result, any connection that is established by using the tactic option would be limited to using only transmit frequencies that fall within the transmit frequency range.

In some respects, the inputs provided via the client device 102 are used to determine which tactic definitions are compatible. Each of the tactic definitions provides a full or partial description what type of action one needs to perform in order to execute the tactic and the constraints that they need to conform to in order to enact this type of tactic. If inputs from the client device (i.e., the connection parameter values that are part of the search query) fall within the ranges or are equal to discrete values of a given tactic definition, then the given tactic definition is deemed to match the search query and used to establish a connection with the space vehicle associated with the search query—meaning that a defined workflow within the given tactic definition can be started to setup/configure the antennas/radios to be able to transmit/receive. On the other hand, if particular inputs (i.e. particular connection parameter values that are part of the search query) fall outside of the ranges specified by another tactic definition or do not equal certain discrete values, then the other tactic definition would not be considered to match the search query and would be used to generate any tactic options in response to the search query. For instance, tactic option 510B includes an identifier 505 (i.e., Procedure_H"), which identifies a tactic definition that is used to generate that tactic option 510B. In the present example, the only information from the tactic definition (referenced by identifier 505) specifically incorporated into the tactic option are guidance parameters.

Additionally or alternatively, in some implementations, any tactic option that is generated based on the tactic definition 800, and in response to a search query, may include all (or at least some) of the connection parameters that are specified in the search query. For instance, if the search query requests a sampling rate of '1.92', the tactic option may include only this sampling rate, and it may omit the rest of the sampling rates that are specified in portion 822 of the tactic definition 800.

Portion 826 may identify the values of one or more commander guidance parameters. Specifically, portion 826 indicates that a "probability of success" guidance parameter has a value of 95%, a "probability of detection" parameter has a value of 0%, a "probability of collateral damage" parameter has a value of 5%, and a "probability of attribution" parameter has a value of 0%. In other words, portion 826 indicates that if a connection is established between a ground resource and a space vehicle, the following is expected (or estimated) to hold true of the connection: (i) the connection has 95% probability of being established and/or maintained successfully; (ii) there is 0% percent probability of the connection being detected; (iii) there is a 0% percent of the ground resource used for the connection being destroyed as a consequence of the ground resource being used to establish the connection, and (iv) there is 0% probability of signals associated with the connection being attributed to a user of the system 100.

Figure 9:
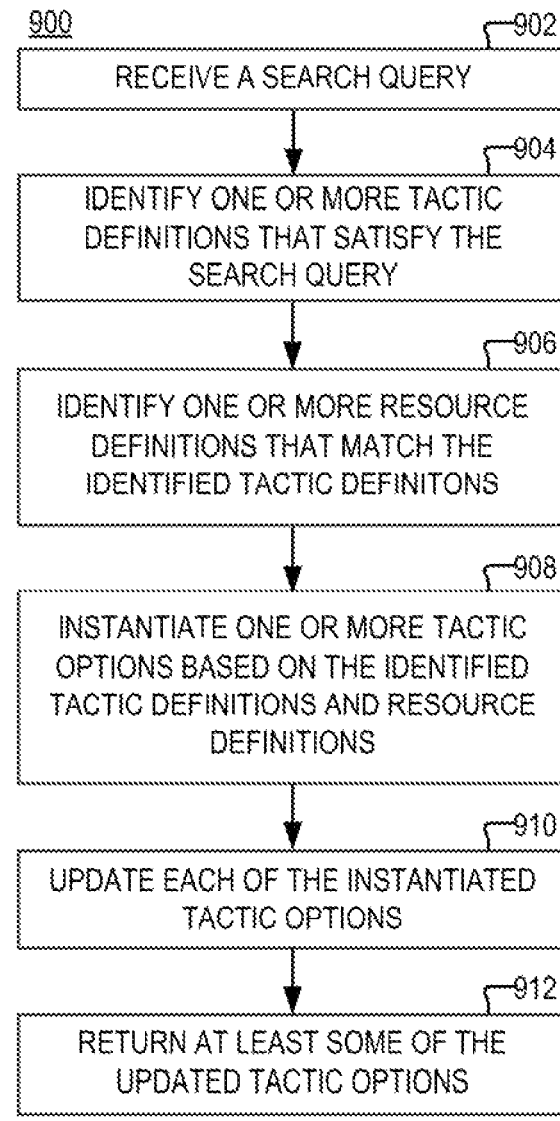
FIG. 9 is a flowchart of an example of a process, according to aspects of the disclosure.

FIG. 9 is a flowchart of an example of a process 900, according to aspects of the disclosure.

At step 902, the engine 603 receives a search query. The search query may be the same or similar to the search query that is transmitted at step 304 of the process 300 (shown in FIG. 3). The search query may identify a set $C_1$ of elements $c_1$. Each element $c_1$ may be one of (i) the value of a respective connection parameter which is acceptable (or desired) for a connection with a space vehicle, (ii) or a range of values for the respective parameter which are acceptable for the connection.

At step 904, the engine 603 identifies one or more tactic definitions that satisfy the search query. Specifically, the engine 603 may retrieve each (or at least one) of the tactic definitions 607 that are stored in the memory 604 (shown in FIG. 6) and determine if the tactic definition satisfies the search query. As noted above, any given one of the tactic definitions 607 can be described as including a set $C_2$ of elements $c_2$. Each of elements $c_2$ may be one of (i) the value of a respective connection parameter which a connection (established in accordance with the given tactic definition 607) is permitted to have, (ii) or a range (or a set) of values for the respective parameter which the connection is permitted to have. According to the present example, the given tactic definition 607 may satisfy the search query (received at step 902) if every element $c_1$ in the set of elements $C_1$ matches a respective one of the elements $c_2$ in the set $C_2$. Additionally or alternatively, in some implementations, the given tactic definition 607 may satisfy the search query (received at step 902) if at least one element $c_1$ in the set of elements $C_1$ matches a respective one of the elements $c_2$ in the set $C_2$. In this regard, it will be understood that the present disclosure is not limited to any specific method for determining whether a tactic definition 607 satisfies a search query.

In some implementations, when an element $c_1$ is a single parameter value and an element $c_2$ is a set of parameter values, the element $c_1$ may match the element $c_2$ if the element $c_1$ is part of the set of parameter values. Additionally or alternatively, when an element $c_1$ is a first set of parameter values and an element $c_2$ is a second set of parameter values, the element $c_1$ may match the element $c_2$ if the element $c_1$ when the two sets intersect. Additionally or alternatively, when an element $c_1$ may match an element $c_2$ if the element $c_1$ includes at least one parameter value that is the same as (or within a predetermined distance from) at least one parameter value that is part of the set $c_2$. The phrase "set of parameter values" as used throughout the disclosure shall be interpreted as referring to a set of one or more parameter values. Additionally or alternatively, when an element $c_1$ is a first value of a specific commander guidance parameter (e.g. probability of detection, etc.) and an element $c_2$ may be a second value for the same commander guidance parameter, the element $c_1$ may match the element $c_2$ if the element $c_2$ is less than or equal to the element $c_1$.

For example, if a search query specifies that a connection is desired to be established which uses transmit frequency 1620 MHz, and this frequency does not fall within the transmit frequency range of a tactic definition, the tactic definition would not satisfy the search query. However, the tactic definition might satisfy the search query if the transmit frequency of the search query falls into the transmit frequency range of the tactic definition (provided that all other elements of the search query also match the tactic definition). As another example, if a search query specifies that a connection is desired to be established which uses transmit sampling rate 2.16, and this sampling rate is not listed in portion 822 of a tactic definition, the tactic definition would not satisfy the search query. However, the tactic definition might satisfy the search query if the sampling rate 2.16 is listed in the tactic definition (provided that all other elements of the search query also match the tactic definition).

At step 906, the engine 603 identifies a set of one or more resource definitions that match the tactic definitions (identified at step 904), and/or satisfy the search query. In some implementations, the engine 603 may retrieve each (or at least one) of the resource definitions 605 from the memory 604 (shown in FIG. 6) and determine if the resource definition matches any of the tactic definitions (identified at step 904). According to the present example, a resource definition is said to match a tactic definition if the resource definition indicates that its corresponding resource is capable of establishing a connection to a space vehicle in accordance with the connection parameters specified by the tactic definition. In other words, a resource definition is set to match a tactic definition if the resource associated with the resource definition supports the connection parameters listed in the tactic definition.

For example, a tactic definition that requires the use of transmission signals in the C-band would not be matched by any resource definition that indicates that its corresponding resource is not capable of transmitting in the C-band. As another example, a tactic definition that requires the use of a sampling rate of 2.88 would not be matched by any resource definition that indicates that its corresponding resource does not support this sampling rate. As yet another example, if a tactic definition requires a set of specific values for different connection parameters and a resource definition indicates that its corresponding resource is capable of establishing a connection whose parameters have the values specified by the resource definition, the resource definition may be said to match the tactic definition. As yet another example, if the search query indicates that a specific type of radio is desired to be used (e.g., Lime), the search query may be satisfied only by resource definitions corresponding to resources that include the same type of radio.

At step 908, the engine 603 instantiates one or more tactic options. Each of the tactic options may be associated with a respective tactic definition that satisfies the search query (identified at step 904) and a respective resource definition that matches the tactic definition (identified at step 906). In some implementations, each of the tactic options may respective identifiers of its associated resource definition and its associated tactic definition. Additionally or alternatively, in some implementations, each of the tactic options may include some (or all) of the information that is part of the tactic option's respective tactic definition and some (or all) of the information that is part of the tactic option's respective resource definition. As noted above, a "tactic option" may include a collection of information (or a collection of connection parameters) for establishing a connection to a specific space vehicle. A tactic option may be represented as an object, a file, a number, an alphanumerical string, a database record, a collection of objects, a collection of files, a collection of alphanumerical strings, etc. It will be understood that the present disclosure is not limited to any specific type of programmatic representation of tactic options.

At step 910, each of the instantiated tactic options is updated. In some implementations, each of the instantiated tactic options may be updated by executing a process 1000, which is discussed further below with respect to FIG. 10.

At step 912, at least some of the instantiated tactic options are returned to a sender of the search query (received at step 902). In some implementations, the tactic options may be returned to the client device 102. In some implementations, only tactic options whose compatibility scores exceed a threshold may be returned. Although in the example of FIG. 9 the process 900 is performed by the backend system 106, alternative implementations are possible in which the process 900 is performed by the client device 102. In such implementations, the receiving of the search query (at step 902) may include receiving user input specifying the search query (via an input device, such as a keyboard or a mouse). Furthermore, in such implementations, the returning of tactic options (at step 904) may include displaying the tactic options on a display screen.

Figure 10:
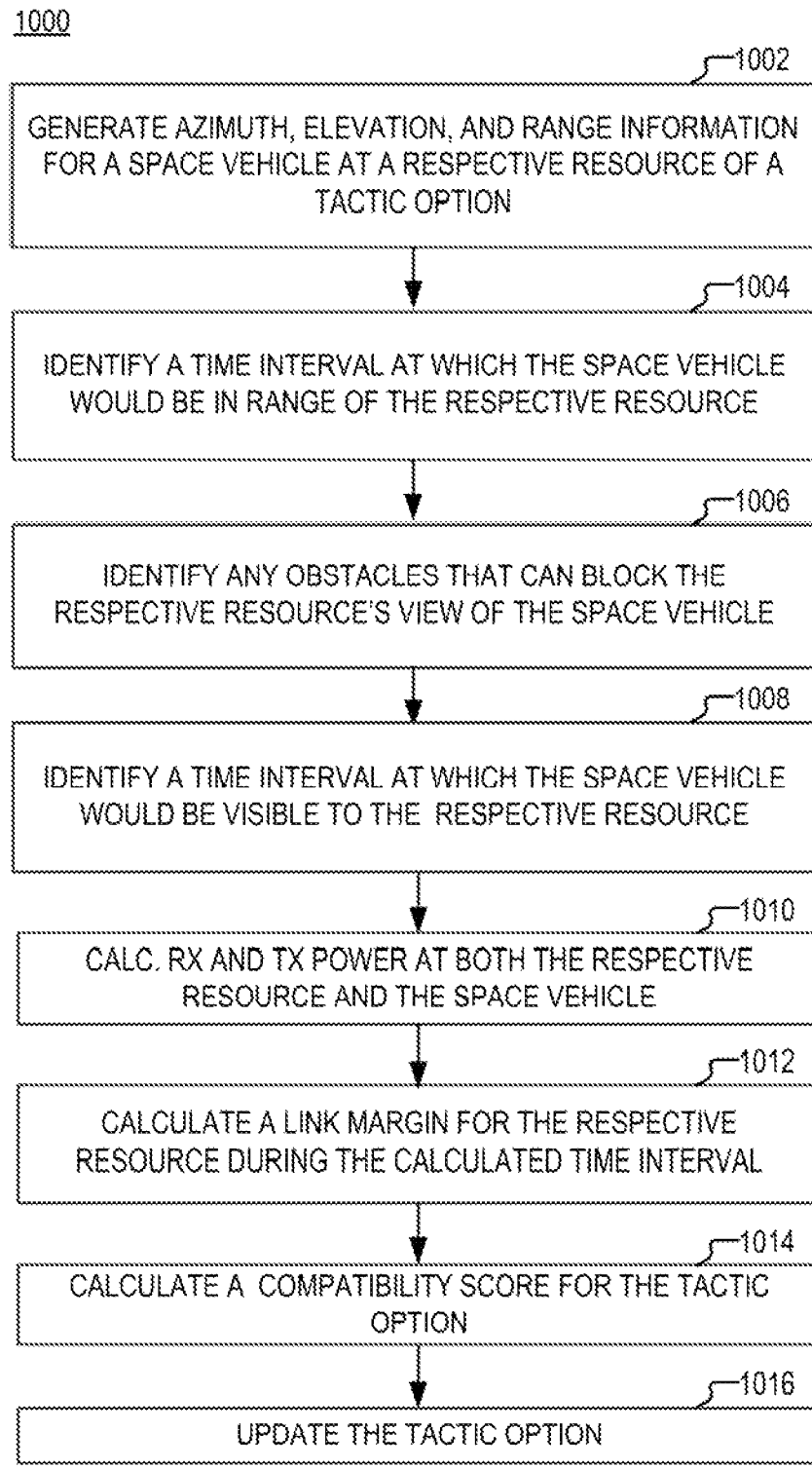
FIG. 10 is a flowchart of an example of a process, according to aspects of the disclosure.

FIG. 10 is a flowchart of an example of a process 1000 for updating a tactic option, according to aspects of the disclosure. As noted above, the process 1000 may be used to update any of the tactic options discussed above with respect to step 910 of the process 900 (shown in FIG. 9). The example of FIG. 10 is provided in the context of one of the tactic options instantiated at step 908 of the process 900 (hereinafter "respective tactic option"). It will be recalled that the respective tactic option is associated with a search query (received at step 902 of the process 900). The search query is associated with a space vehicle (hereinafter "target space vehicle"). As noted above, the respective option contains (or is otherwise associated with) information that is found in one of the tactic definitions (hereinafter "corresponding tactic definition"). Furthermore, as noted above, the respective tactic option contains (or is otherwise associated with) information that is part of one of the resource definitions (hereinafter "corresponding resource definition"). The corresponding resource definition is associated with a specific resource (hereinafter "corresponding resource"), which could potentially be used to establish a connection with the target space vehicle. In some respects, the process 1000 determines to what extent (if any) the corresponding resource would satisfy the requirements for establishing a connection with the target space vehicle (which are set out in the search query), when the connection is established in accordance with the constraints listed in the corresponding tactic definition.

At step 1002, the engine 603 identifies the azimuth, elevation, and range of the target space vehicle with respect to the corresponding resource. The azimuth, elevation, and range may be identified based on information about the target space vehicle (e.g., target vehicle identifier) that is provided in the search query. Additionally or alternatively, the azimuth, elevation, and range may be identified further based on the physical location of the corresponding resource, which is identified in the corresponding resource definition (or elsewhere).

At step 1004, the engine 603 performs a visibility calculation to identify a time interval in which the target space vehicle would be within the range of the corresponding resource. The time interval may be identified based on information about the orbit of the target space vehicle. The time interval may be determined further based on the physical location of the corresponding resource, which is identified in the corresponding resource definition (or elsewhere).

At step 1006, the engine 603 identifies any obstacles that might block the corresponding resource's view of the space vehicle. In some implementations, the obstacles may be identified by using information provided in the corresponding resource definitions. In some implementations, at step 1006, the engine 603 may generate (in tabular or graphic form) an obscura plot, such as that shown in FIG. 5C. In some implementations, at step 1006, the engine 603 may generate obscure crossing information, such as that shown in FIG. 5C.

At step 1008, the engine 603 identifies a time interval in which the target space vehicle would be visible to the corresponding resource. The time interval may be determined based on the information identified at steps 1002-1006. In some implementations, the time interval in which the target space vehicle would be visible to the corresponding resource may be a time range in which the target space vehicle is within the range of the corresponding resource and is not blocked by any obstacles.

At step 1010, the engine 603 calculates transmit and receive power at both the corresponding resource and the target space vehicle. For example, the engine 603 may calculate the power at which signals can be received from the corresponding resource at the target space vehicle. Additionally or alternatively, the engine 603 may calculate the power at which signals can be received from the target space vehicle at the corresponding resource. Additionally or alternatively, the engine 603 may calculate the power at which signals can be transmitted to the target space vehicle by the corresponding resource. Additionally or alternatively, the engine 603 may calculate the power at which signals can be transmitted by the target space vehicle to the corresponding resource.

At step 1012, the engine 603 calculates a link margin for a connection (hereinafter "corresponding connection") that could be established between the corresponding resource and the target space vehicle in accordance with the corresponding target definition. Depending on the type of connection that is requested by the search query (or the type of the corresponding tactic definition), calculating the link margin may include one or both of: (i) calculating a link margin for a downlink that is part of the connection and/or (ii) calculating a link margin for an uplink that is part of the connection. Link Margin may be the amount by which the received power exceeds receiver sensitivity. Additionally or alternatively, link margin may also be defined as the amount by which a received signal level may be reduced without causing system performance to fall below a specified threshold value. According to the present example, the system link margin, as calculated, is the difference in dB between the Energy Bit to Noise Ratio and the Energy Bit to Noise Ratio threshold. The Energy Bit to Noise ratio can be based on the Signal to Noise Ratio (SNR) per bit. The Energy Bit to Noise Ratio Threshold can be based on the Modulation Theoretical SNR minus any Coding Gain plus any Total Implementation Loss.

At step 1014, the engine 603 calculates a compatibility score for the given tactic option. The compatibility score may be calculated by: (i) normalizing each (or at least two) of the values calculated at any (or at least one) of steps 1002-1010, and (ii) calculating a weighted average of the values. According to the present example, the compatibility score is calculated based on the closest range/distance using the least amount of power. Both range and power information is normalized to be between 1 and 100. The minimum range value is weighted at 50%. Depending on the tactic option type (RX, TX or TX_RX) the minimum power values are weighted differently. For TX and RX tactic options, the minimum power weight is 50%. For TX_RX tactic options both the minimum TX and RX power weights are 25%. In some implementations, the compatibility score may be calculated based on one of equations 1-3 below:

Compatibility Score=0.5(100−normalized(minimum-Range))+0.5(100−normalized(minimumReceive-Power)    (Eq. 1)

Compatibility Score=0.5(100−normalized(minimum-Range))+0.5(100−normalized(minimumTransmitPower)    (Eq. 2)

Compatibility Score=0.5(100−normalized(minimum-Range))+0.25(100−normalized(minimumReceivePower)+0.25(100−normalized(minimumTransmitPower)    (Eq. 3)

In some implementations, Equation 1 may be used to calculate the compatibility score for transmit tactic options that are useable to establish a connection, which is to be used only for the transmission of data (i.e., TX tactic option). Equation 2 may be used to calculate the compatibility score for transmit tactic options that are useable to establish a connection, which is to be used only for the reception of data (i.e., RX tactic option). And Equation 3 may be used to calculate the compatibility score for tactic options that are useable to establish a connection, which is to be used for both the reception and transmission of data (i.e., TX_RX tactic option).

At step 1016, the engine 603 updates the given tactic option to include any of the information generated at steps 1002-1014. In some implementations, the engine 603 may include, in the given tactic option, an indication of a time interval in which the target space vehicle would be visible to the corresponding resources. Additionally or alternatively, in some implementations, the engine 603 may include, in the given tactic option, the azimuth, elevation, and range information for the target space vehicle at the location of the corresponding resource. Additionally or alternatively, in some implementations, the engine 603 may include, in the given tactic option, an obscura plot and/or obscura crossing information for the target space vehicle at the location of the corresponding resource. Additionally or alternatively, in some implementations, the engine 603 may include, in the given tactic option, an indication of transmit and/or receive power for both (or one) of the target space vehicle and the corresponding resource.

As noted above, the search query that prompted the generation of the given tactic option may identify a time window for the connection to the space vehicle. The given target option, on the other hand, may include an indication of a time window in which the space vehicle would be visible to the given resource. If both time windows do not match, the given target option may be filtered out, and not returned at step 912. Alternatively, when both windows do not match, the given target option may be given a lower compatibility score and returned at step 912.

As noted above, the tactic definition used to generate the given tactic option may specify a receive power range and a transmit power range (e.g., see portions 818 and 820, which are shown in FIG. 8). Similarly, the process 1000 calculates (at step 1010) receive and transmit power of the corresponding resource. If the calculated receive or transmit power is located outside of the ranges for the corresponding tactic definition, the given target option may be filtered out, and not returned at step 912. Alternatively, when the calculated receive or transmit power is located outside of the ranges for the corresponding tactic definition, the given target option may be given a lower compatibility score and returned at step 912.

FIGS. 1-10 are provided as an example only. At least some of the steps discussed with respect to FIGS. 1-10 may be performed in parallel, in a different order, or altogether omitted. As used in this application, the word "exemplary" is used herein to mean serving as an example, instance, or illustration. It will be understood that the present disclosure is not limited to any specific item information being included in a search query. It will be understood that the present disclosure is not limited to any specific item of information being included in a tactic option. It will be understood that the present disclosure is not limited to any specific item of information being included in a tactic definition and/or a resource definition.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the disclosure and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed disclosure. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed disclosure. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed disclosure.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed disclosure might be made by those skilled in the art without departing from the scope of the following claims.

The invention claimed is:

1. A method, comprising:
receiving a search query for resources that are configured to establish a connection with a space vehicle, the search query including a first value for a connection parameter;
identifying one or more tactic definitions that satisfy the search query, each of the tactic definitions including one or more second values for the connection parameter, wherein at least one of the second values for the connection parameter matches the first value for the connection parameter that is included in the search query;
generating one or more tactic options, each of the tactic options being generated based on a respective one of the tactic definitions, each of the tactic options being associated with a respective resource of the tactic option, the respective resource of the tactic option being one that is compatible with the tactic definition used as a basis for generating the tactic option; and
returning at least one of the tactic options in response to the search query.

2. The method of claim 1, wherein the connection parameter includes at least one of receive frequency, sampling rate, receive power, transmit modulation, transmit frequency, transmit power, and transmit modulation.

3. The method of claim 1, wherein generating any of the tactic options includes identifying the respective resource of the tactic option by performing a search of a plurality of available resource definitions to identify a resource that is compatible with the respective tactic definition that is being used to generate the tactic option.

4. The method of claim 1, wherein the respective resource of any of the tactic options includes a ground station or another space vehicle.

5. The method of claim 1, wherein each of the tactic options identifies a time window during which the space vehicle would be visible to the respective resource of the tactic option.

6. The method of claim 1, wherein any of the tactic options includes a specific combination of values of different connection parameters that have been pre-approved to be used together in establishing connections with space vehicles.

7. The method of claim 1, wherein generating any of the tactic options includes:
generating a score for the tactic option; and
including the score into the tactic option.

8. The method of claim 1, wherein the connection parameter includes a commander guidance parameter.

9. The method of claim 1, wherein any of the tactic options identifies a time window during which the space vehicle would be visible to a respective resource of the tactic option.

10. A system, comprising:
a memory; and
at least one processor operatively coupled to the memory, the at least one processor being configured to perform the operations of:

receiving a search query for resources that are configured to establish a connection with a space vehicle, the search query including a first value for a connection parameter;

identifying one or more tactic definitions that satisfy the search query, each of the tactic definitions including one or more second values for the connection parameter, wherein at least one of the second values for the connection parameter matches the first value for the connection parameter that is included in the search query;

generating one or more tactic options, each of the tactic options being generated based on a respective one of the tactic definitions, each of the tactic options being associated with a respective resource of the tactic option, the respective resource of the tactic option being one that is compatible with the tactic definition used as a basis for generating the tactic option; and returning at least one of the tactic options in response to the search query.

11. The system of claim 10, wherein the connection parameter includes at least one of receive frequency, sampling rate, receive power, transmit modulation, transmit frequency, transmit power, and transmit modulation.

12. The system of claim 10, wherein generating any of the tactic options includes identifying the respective resource of the tactic option by performing a search of a plurality of available resource definitions to identify a resource that is compatible with the respective tactic definition that is being used to generate the tactic option.

13. The system of claim 10, wherein the respective resource of any of the tactic options includes a ground station or another space vehicle.

14. The system of claim 10, wherein each of the tactic options identifies a time window during which the space vehicle would be visible to the respective resource of the tactic option.

15. The system of claim 10, wherein any of the tactic options includes a specific combination of values of different connection parameters that have been pre-approved to be used together in establishing connections with space vehicles.

16. The system of claim 10, wherein generating any of the tactic options includes:
generating a score for the tactic option; and
including the score into the tactic option.

17. The system of claim 10, wherein the connection parameter includes a commander guidance parameter.

18. The system of claim 10, wherein any of the tactic options identifies a time window during which the space vehicle would be visible to a respective resource of the tactic option.

19. A non-transitory computer-readable medium storing one or more processor-executable instructions, which when executed by at least one processor cause the at least one processor to perform the operations of:

receiving a search query for resources that are configured to establish a connection with a space vehicle, the search query including a first value for a connection parameter;

identifying one or more tactic definitions that satisfy the search query, each of the tactic definitions including one or more second values for the connection parameter, wherein at least one of the second values for the connection parameter matches the first value for the connection parameter that is included in the search query;

generating one or more tactic options, each of the tactic options being generated based on a respective one of the tactic definitions, each of the tactic options being associated with a respective resource of the tactic option, the respective resource of the tactic option being one that is compatible with the tactic definition used as a basis for generating the tactic option; and returning at least one of the tactic options in response to the search query.

20. The non-transitory computer-readable medium of claim 19, wherein the connection parameter includes at least one of receive frequency, sampling rate, receive power, transmit modulation, transmit frequency, transmit power, and transmit modulation.

* * * * *